Feb. 28, 1939.                    M. H. SENIOR                   2,148,841
         COMBINATION LAWN MOWER, TRIMMER, SWEEPER, AND SOIL WORKING MACHINE
                    Filed Feb. 26, 1936          3 Sheets-Sheet 1
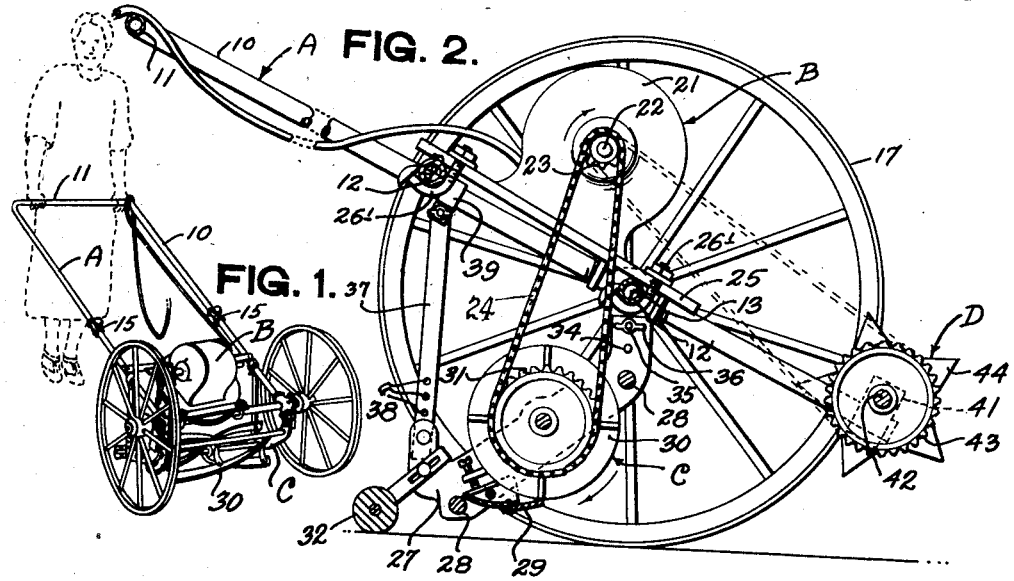
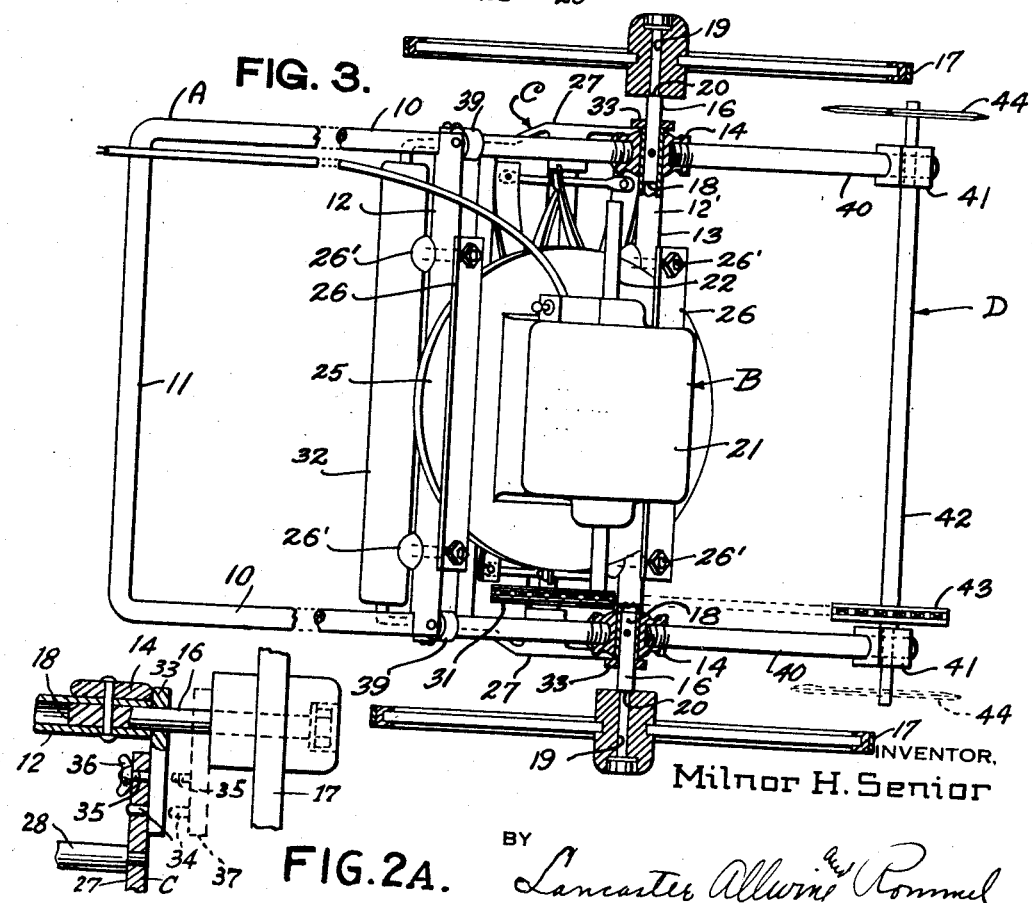
INVENTOR.
Milnor H. Senior
BY
Lancaster, Allwine & Rommel
ATTORNEYS.

Feb. 28, 1939.  M. H. SENIOR  2,148,841
COMBINATION LAWN MOWER, TRIMMER, SWEEPER, AND SOIL WORKING MACHINE
Filed Feb. 26, 1936   3 Sheets-Sheet 2
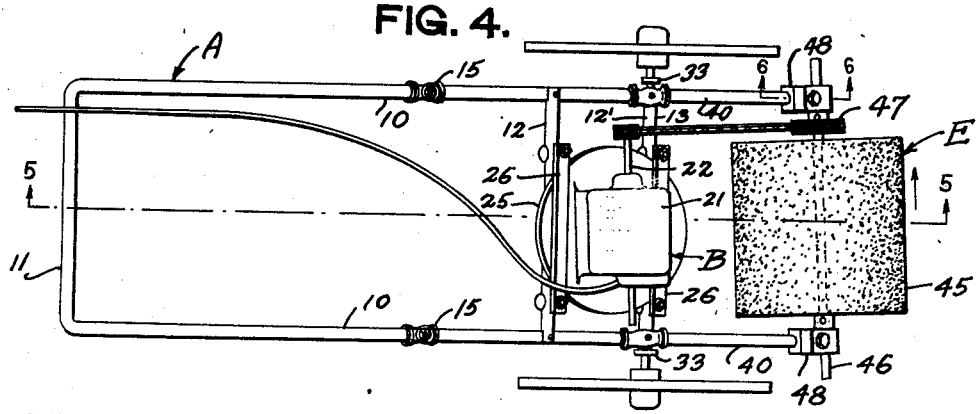
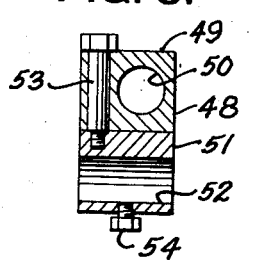
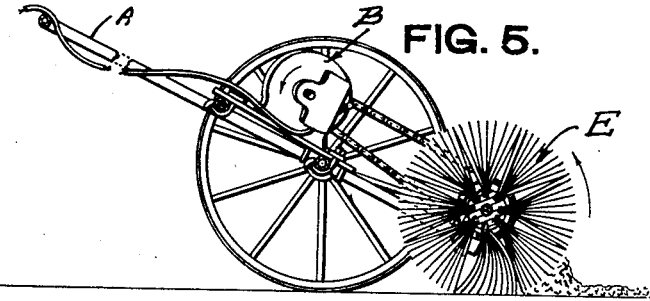
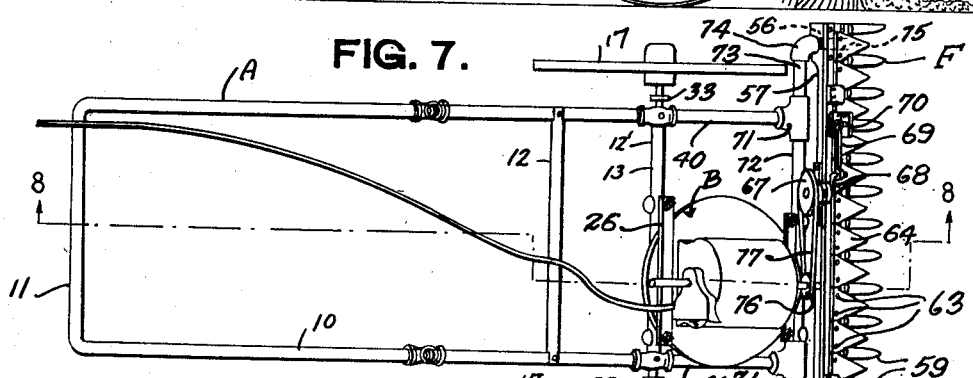
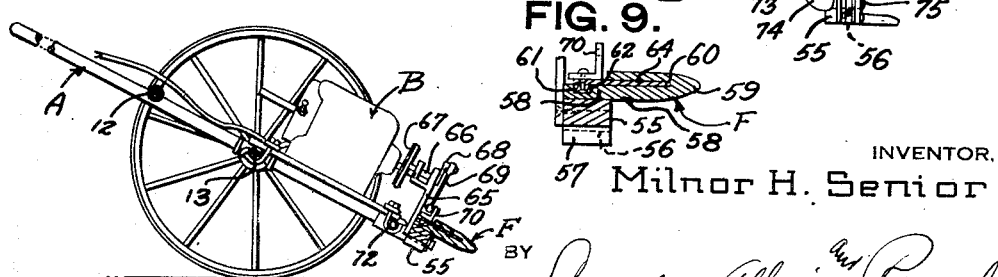
INVENTOR.
Milnor H. Senior
BY
Lancaster, Allwin and Rommel
ATTORNEYS.

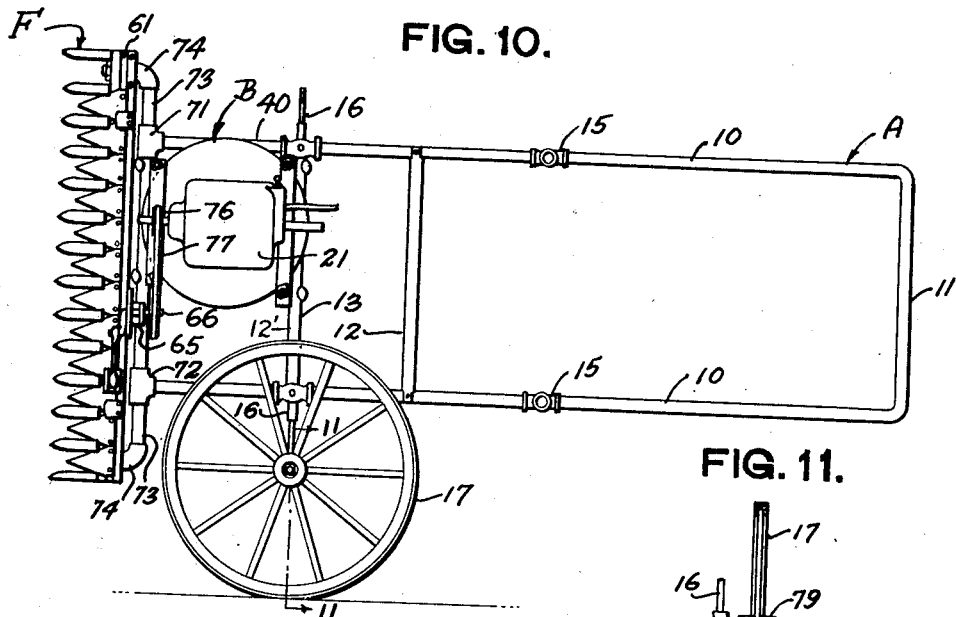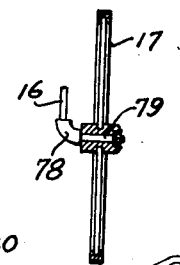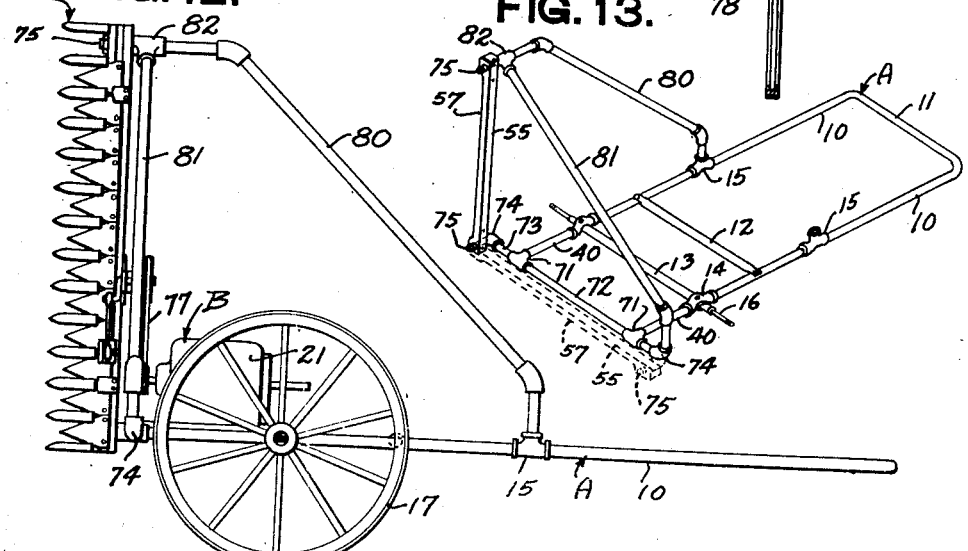

Patented Feb. 28, 1939

2,148,841

UNITED STATES PATENT OFFICE 2,148,841

COMBINATION LAWN MOWER, TRIMMER, SWEEPER, AND SOIL WORKING MACHINE

Milnor H. Senior, Pittstown, N. J.

Application February 26, 1936, Serial No. 65,898

6 Claims. (Cl. 56—26)

This invention relates to an improved combination lawn mower, trimmer, sweeper and soil working machine and an important object of the invention is to provide a lawn mower including a motor driven cutting reel which may be adjusted relative to the frame of the lawn mower.

Another object of the invention is to provide a lawn mower including a removably mounted cutting reel assembly.

A further object of the invention is to provide a lawn mower having a motor assembly slidably and angularly adjustable on the frame of the mower.

A still further object is to provide a lawn mower having a frame adapted for receiving various tools and implements in operative relation thereto.

Another object of the invention is to provide a wheeled frame having a motor assembly adjustably mounted thereon and adapted to actuate a rotatable member, such as a cylindrical brush, adjustably carried by the frame and having its axis oblique to the normal direction of travel of the wheeled frame.

A further object of the invention is to provide a combined mower and hedge trimmer having a motor driven cutting mechanism adjustable to either a vertical or a horizontal cutting position.

Other objects and advantages of the invention will be apparent during the course of the following detailed description, taken in connection with the accompanying drawings, forming a part of this specification, and in which drawings, Figure 1 is a perspective view of the improved lawn mower.

Figure 2 is a longitudinal sectional view of the improved lawn mower and showing a soil working assembly secured to the mower.

Figure 2A is a detail view, partly in elevation and partly in vertical section showing means to detachably support the mower asembly from the wheeled support.

Figure 3 is a view of the structure shown in Figure 2 partly in top plan and partly in horizontal section.

Figure 4 is a top plan view of a sweeper assembly secured to the main frame of the lawn mower.

Figure 5 is a longitudinal sectional view of the same.

Figure 6 is a sectional view taken on the line 6—6 of Figure 4.

Figure 7 is a top plan view of a trimmer assembly secured to the main frame of the lawn mower.

Figure 8 is a longitudinal sectional view of the same.

Figure 9 is an enlarged sectional view of the trimmer assembly shown in Figure 8.

Figure 10 is a view in side elevation showing one method of securing the trimmer assembly in a vertical position.

Figure 11 is a sectional view taken on the line 11—11 of Figure 10.

Figure 12 is a view in side elevation showing a second method of supporting the trimmer assembly in a vertical position.

Figure 13 is a perspective view of the framework shown in Figure 12.

In the drawings, wherein for the purpose of illustration are shown preferred and modified forms of the invention and wherein similar reference characters denote corresponding parts throughout the several views, the letter A may generaly designate the main frame of the lawn mower having adjustably mounted thereon a motor assembly B adapted to be operatively connected to a lawn mower assembly C. A soil working assembly D, a sweeper assembly E and a trimmer assembly F may each be detachably secured to the main frame A and operatively connected to the motor assembly B.

The main frame A may be rectangular in shape and may comprise a pair of elongate members 10 forming opposite sides of the frame, a cross member 11 at one end of the frame forming a handle and a pair of spaced cross members or bars 12 and 12' at the opposite end thereof. The frame A may be made of 1-inch tubular pipe if desired and the side members may be joined to the ends of the cross member or bar 12' by a pair of threaded pipe receiving sockets 14. Intermediate the ends of the side members 10, the frame may be provided with a pair of threaded pipe receiving sockets 15, one socket being provided for each side. Rotatably mounted in co-axial spaced relation on opposite sides of the frame as by suitable stub axles 16 is a pair of ground wheels 17. The inner ends 18 of the axles 16 may be anchored within the exposed open end portions of the cross member or bar 12' of the frame, one axle being positioned in each end portion thereof. The outer ends 19 of the axles 16 may be reduced in diameter forming shoulders 20 which serve to space the wheels outwardly of the frame.

In the example shown, the cross member or bar 12' and the stub axles 16 constitute a dead axle 13 for support of the main frame A on the ground wheels 17.

As for the motor assembly B, it may include an electric motor 21 provided with an armature shaft 22 which may project from the motor at opposite ends. This armature shaft is preferably adapted to adjustably and removably receive at either of its ends a suitable sprocket wheel 23. A suitable chain 24 may be provided for use in conjunction with the motor assembly. The motor is preferably provided with a flat disc-like base 25 of a diameter greater than the distance between the cross members or bars 12 and 12' of the frame.

A pair of fastening straps 26 provided at their ends with suitable hook bolts 26' may be employed in conjunction with the cross members or bars 12 and 12' for mounting the motor on the frame in slidable and angularly adjustable relation thereto.

The lawn mower assembly C may include a pair of oppositely spaced castings of end members 27 provided with suitable spacer bars 28 and a stationary blade 29 adjustably mounted between the members 27. A rotatable cutting reel 30 provided at one end with a sprocket wheel 31 may be suitably mounted between the members 27 for coaction with the stationary blade and a suitable ground roller 32 may be provided for the lawn mower assembly C. The assembly C may be pivotally secured to the frame as by straps or supports 33 pivoted to the axles 16 at their upper ends and rigidly but detachably secured at their lower ends to the members 27 as by a double pin connection, the pin 34 of which may be exteriorly smooth while the pin 35 may be threaded to receive a wing nut 36 serving to tightly clamp the parts together. It will be noted from an inspection of Figure 3 that when the mower assembly C is so mounted, the supports 33 will be drawn into contact with the opposite sides of the frame, the space between the respective sides of the frame and the axle shoulders 20 permitting the members 27 to be disconnected from the supports 33 without removing the ground wheels from the frame. The position of the lawn mower assembly C may be adjusted to the main frame A by links 37 each provided at one end with a plurality of adjustment openings 38 adapted for connection to the mower assembly. The other ends of these links may be connected to opposite side members of the frame by clamping rings 39. A pair of relatively short pipes 40 may be secured one in each of the sockets 14 whereby extensions of the side rails 10 beyond the axle housing 13 are provided.

In the example shown, the sprocket wheels 23 and 31, and the chain 24 constitute suitable motion transmitting means operatively connecting the mower to the motor.

In the operation of the lawn mower, the motor is positioned on the frame whereby motion may be transmitted from the motor shaft 22 to the cutting reel 30 to rotate the cutting reel in a normal cutting relation to the stationary blade 29 as shown in Figure 2. To sharpen the lawn mower, it is only necessary to reverse the position of the motor assembly with respect to the frame and connect the oposite end of the motor shaft to the cutting reel, whereupon a reverse or sharpening motion will be imparted to the cutting reel.

Referring to the soil working assembly D, it may include a pair of bearing blocks 41 suitably supported on the extension pipes 40, a shaft 42 journalled in the bearing blocks, a sprocket wheel 43 secured to the shaft preferably adjacent one of the bearing blocks and a soil working implement such as a star-shaped lawn-edge-cutting blade 44 suitably mounted on the shaft.

To utilize the soil worker, the motor assembly B is adjusted on the frame A to a position whereby the sprocket wheel 23 thereof may be connected to the sprocket wheel 43 of the soil worker assembly D for rotating the soil working implement 44. In operation, the implement is lowered into contact with the ground by merely raising the handle 11 of the frame.

Referring now to the sweeper assembly E, it may comprise a flexible cylindrical brush 45, its axle 46 being provided with a sprocket wheel 47 and having its ends rotatably mounted in slidable and angularly adjustable bearings 48. These bearings 48 may each include a block 49 provided with a shaft opening 50 and pivotally mounted on a second block 51 provided with a pipe opening 52, the pivot screw 53 passing through a clear hole in the block 49 and screwing into a tapped hole in the second block 51. A set screw 54 may be mounted in each block 51 for securing each bearing to one of the pipes 40 in a slidably adjusted position. Each block 49 may rotatably carry in its shaft opening 50 one end of the axle 46. By means of the pivot screw 53, the blocks 49 may assume various angular positions with respect to the blocks 51 which in turn are carried by the pipes 40 extending thru the openings 52 so that the blocks 51 may be longitudinally adjusted on the pipes by means of the screws 54. The sweeper assembly may thus be arranged in oblique relation to the pipes 40 and to the main frame A, as shown in Figure 4.

In order to rotate the sweeper in a counterclockwise direction as viewed in Figure 5, the motor assembly B may be given half a turn and also may be additionally adjusted to an oblique position with respect to the frame so that the motor may be operatively connected to the brush assembly when the same is obliquely positioned relative to the frame. As shown in Figure 4, the brush is adapted to sweep to the left of the frame but obviously the relative position of the various parts may be altered to cause the brush to sweep to the opposite side.

The trimmer assembly F may include an elongate wooden supporting base 55 provided at each end with an opening 56. The base may be reduced in thickness intermediate its ends as shown at 57. Fixedly mounted on the base may be a stationary cutter bar 58 provided with a series of projecting fingers 59 each having a longitudinal slot 60. The cutter bar 58 may be provided with a longitudinal groove 61 for carrying and guiding a strip 62 to which may be secured as by countersunk rivets 63 the movable reciprocating cutter 64 preferably consisting of a plurality of triangular shaped blades. These blades are adapted to intersect the slotted fingers 59 upon reciprocation of the movable cutter bar over the stationary cutter bar. An upwardly extending bracket 65 fixed to the supporting base 55 and supporting a shaft 66 above the movable cutter 64 may be provided, the shaft 66 being fitted with a fixed pulley wheel 67 and a crank arm 68 operatively connected by a pitman 69 to an angle bracket 70 fastened to the movable cutter bar.

In Figure 7 is shown a preferred method of associating the trimmer assembly F with the main frame A. A pair of T's 71 are mounted one on each of the pipes 40 at their projecting ends and supported between these T's is a cross member or bar 72. Projecting laterally from the T's 71 and terminating at opposite sides of the frame and preferably beyond the ground wheels thereof are the pipes 73. A pair of elbows 74 are supported in spaced relation and at opposite sides of the frame at the outer ends of the pipes 73 and a pair of relatively short pipes 75 are mounted one in each of the elbows 74 and in parallel relation to each other. The trimmer assembly F may be supported in a substantially horizontal position on these pipes 75 which fit one in each of the openings 56 of the trimmer base 55. The motor assembly A may be positioned on the cross members or bars 12' and 72 with its shaft at right angles thereto for connection by a suitable pulley 76 and a belt 77 to the trimmer assembly F.

When it is desired to position the trimmer F in a vertical position, an elbow 78 may be secured to one of the axles 16 of the main frame A. The elbow may carry an auxiliary axle 79 at right angles to the first axle 16 whereby the entire frame A including the motor assembly B and the trimmer assembly F may be tilted and supported by a single ground wheel with the trimmer in a vertical plane. The other ground wheel is preferably removed to eliminate any possible interference with the cutting or trimming of vertical objects such as hedges.

When an extensive amount of vertical cutting or trimming work is to be performed, the modified arrangement shown in Figures 12 and 13 will be found advantageous. In this form of the invention, the main frame is supported in its normal or horizontal position by the ground wheels 17 and has associated therewith means for supporting an end of the trimmer assembly in an elevated position. The supporting means may comprise an inclined side brace 80 having its lower end threaded into a socket 15 at one side of the main frame A and an inclined cross brace 81 connected at its lower end to the elbow 74 at the opposite side of the frame, one arm of this elbow having been swung to a vertical position as shown in Figures 12 and 13. The braces 80 and 81 preferably are joined by a T 82 positioned vertically above the other elbow 74 whereby one of the pipes 75 may be supported vertically above its mate and in parallel relation thereto. The trimmer assembly F may be supported in a substantially vertical position at a corner of the frame A on these pipes 75 which are adapted to fit one in each of the openings 56 of the trimmer base 55. From a comparison of the dotted and full line positions of the trimmer base 55 shown in Figure 13, it will be noted that the location of both ends of the base is changed when the trimmer is moved from a horizontal to a vertical position, the reduced portion 57 being in both instances positioned adjacent the work. The position of the motor assembly may remain substantially the same regardless of whether the trimmer is horizontally positioned as in Figure 7 or vertically as in Figure 12 but if the tension on the belt connecting the motor and trimmer assemblies requires adjustment, this may be secured by laterally adjusting the motor assembly on the frame A. By suitably manipulating the braces 80 and 81 and the parts associated therewith, the trimmer assembly F may be vertically supported at the opposite corner of the frame.

Various changes may be made to the forms of invention herein shown and described, without departing from the spirit of the invention or the scope of the following claims.

I claim:

1. A mower including a mobile frame, a rotatable cutting reel and a coacting stationary blade carried by the frame, a motor having a circular base releasably secured to the frame, the motor including a double-end drive shaft operatively connected at one end to the cutting reel for rotating the cutting reel in a given direction, the base being rotatably adjustable relative to the frame and securable in a position whereby the drive shaft may be operatively connected at its other end to the cutting reel for rotating the cutting reel in the opposite direction.

2. A mower including a mobile frame, a rotatable cutting reel and a coacting stationary blade carried by the frame, a motor releasably secured to the frame, the motor including a double-end drive shaft operatively connected at one end to the cutting reel for rotating the cutting reel in correct cutting relation to the stationary blade, the motor being rotatably adjustable end for end to a position wherein the ends of the drive shaft are reversed, the drive shaft in its reverse position being adapted for connection at its other end to the cutting reel for rotating the cutting reel in sharpening relation to the stationary blade.

3. In a device of the class described, a tool-supporting frame including a dead axle and a bar in spaced relation to the axle, at least one ground wheel on the axle, a handle for the frame, a motor including a base resting on the axle and the bar, means adjustably securing the base to the axle and the bar, a mower adjustably supported by the frame, and motion transmitting means operably connecting the mower to the motor.

4. The combination with a frame including an axle and a handle extending from the axle, and at least one ground wheel pivotally supporting the axle whereby to permit raising and lowering of the handle, of a mower assembly pivotally secured to the frame and provided with an adjustable ground roller for raising and lowering the mower assembly to vary the cutting height thereof, and means supporting the handle in adjustably spaced relation to the mower assembly, whereby the normal height of the handle with respect to the ground may be maintained with the mower assembly adjusted to any one of a plurality of cutting heights.

5. In a mower, a frame including an axle and a handle extending from the axle, at least one ground wheel pivotally supporting the axle whereby to permit raising and lowering of the handle, a mower assembly, including a rotatable cutter, pivotally secured to the frame and provided with a ground roller supporting the mower assembly and determining the cutting height thereof, means supporting the handle in adjustably spaced relation to the ground, a motor, means releasably securing the motor in adjustable relation longitudinally of the frame, whereby the motor and the rotatable cutter may be positioned in predetermined spaced relation with the handle adjusted to any one of a plurality of positions relative to the ground, and motion transmitting means connecting the motor and the rotatable cutter.

6. In combination, a wheeled frame; a mower assembly including a pair of spaced apart end members; a companion support for each of said spaced apart end members, said supports carried by said frame, and each of said supports movable into and out of adjacent relation to its respective end member, and at least one of each end member and companion support having means to interengage with the other upon movement of the support into said adjacent relation to its respective end member; and means releasably securing each end member and companion support in said adjacent relation.

MILNOR H. SENIOR.